(No Model.)

W. M. BROWN.
CLAMP FOR USE IN WELDING RAILWAY RAILS.

No. 546,773. Patented Sept. 24, 1895.

WITNESSES:
H. C. Steff
August von Bayer.

INVENTOR
W. Milt. Brown
BY
Ward Raymond,
ATTORNEY.

UNITED STATES PATENT OFFICE.

WILLIAM MILTON BROWN, OF JOHNSTOWN, PENNSYLVANIA, ASSIGNOR TO THE JOHNSON COMPANY, OF SAME PLACE.

CLAMP FOR USE IN WELDING RAILWAY-RAILS.

SPECIFICATION forming part of Letters Patent No. 546,773, dated September 24, 1895.

Application filed June 24, 1895. Serial No. 553,838. (No model.)

*To all whom it may concern:*

Be it known that I, WILLIAM MILTON BROWN, of Johnstown, county of Cambria, State of Pennsylvania, have invented a new and useful Improvement in Clamps for Use in Welding Railway-Rails, of which the following specification is a true and exact description, due reference being had to the accompanying drawings.

My invention especially relates to clamps for temporarily holding the adjoining ends of two rails together while a permanent joint is being made.

The object of my invention is to provide a clamp which may be quickly and easily placed in position and secured, and which will firmly hold the adjoining rails in alignment, while at the same time not interfering with the travel of car-wheels along the track.

It also has other features, which I will hereinafter describe.

This clamp is specially adapted to use in welding railroad-rails together in the manner described in Letters Patent No. 526,434, issued September 25, 1894, and I will describe it as applied to a joint about to be so welded.

Figure 1:
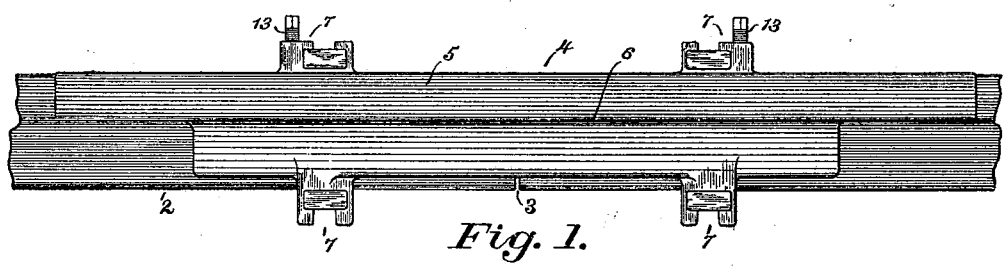
Figure 2:
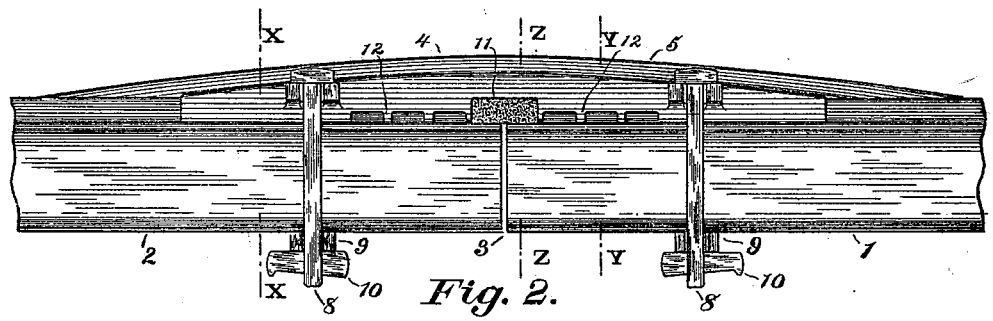
Figure 3:
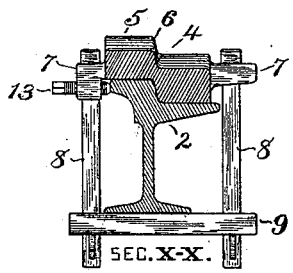
Figure 4:
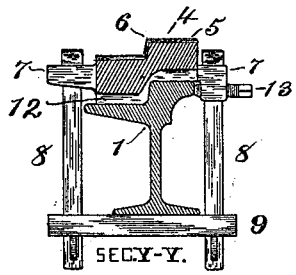
Figure 5:
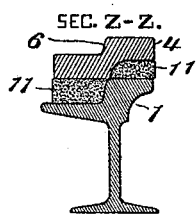

In the drawings, Figure 1 shows a top view of a clamp embodying my invention. Fig. 2 is a side view of Fig. 1. Figs. 3, 4, and 5 are respectively sections on lines X, Y, and Z of Fig. 2.

1 and 2 are the two rails about to be welded at the joint 3. Lying upon the top of the rails, and so shaped as to closely conform to them, is the clamp 4. This clamp has the head-surface 5 and gage-line 6 in alignment with the gage-line of the track-rails. Its surface slopes from the center each way toward the ends, thus forming a gradual ascent and descent for the car-wheel. Projecting from each side of the clamp are the lugs 7, having the open slots, as shown. Through these slots pass the holding-down bolts 8, which also pass through the bottom clamps 9, the whole being drawn tight by keys 10.

In the center of the clamp is formed a recess adapted to contain one or more blocks of carbon 11. The object of this carbon is twofold. It is shaped to fit the rail, and therefore as it bears directly upon that portion which becomes highly heated and soft it acts as a former and retains the softened metal in shape. The highly-heated steel also absorbs carbon from the block, which thus has a hardening effect upon the weld. The form of these carbon blocks is clearly shown in Fig. 5, where one block is shaped to fit the tram portion and another block to fit the head. Various shapes of rails might, however, require a modification of these.

In order to prevent as much as possible the clamp absorbing heat from the weld and conducting it away, the middle portion of the body of the clamp does not bear directly upon the rail, but is cut away, leaving only the ribs 12 in contact, as is shown in Fig. 4.

In order to insure the clamps fitting laterally snugly against the gage-line of the rails, I may provide the gages or set-screws 13, which will draw them into position and insure perfect alignment of the rails.

For use in electric-welding joints these clamps are preferably made of gun-metal or other non-magnetic metal, but for other uses they may be made of steel or any suitable material.

It will thus be seen that I provide a clamp which while firmly holding two rails in alignment at the same time offers little obstruction to the travel of cars and is readily put on and taken off. The carbon blocks may of course be omitted, if not deemed necessary.

By the use of the open slots in lugs 7 and the keys 10 I am enabled to adjust and secure the clamp very quickly, and a few blows of the hammer upon the keys 10 loosens the whole device for removal.

Having thus described my invention, what I claim, and desire to protect by Letters Patent, is—

1. A clamp for railroad rail joints, said clamp comprising a body portion adapted to lie upon the rails and having a track surface thereupon aligning with that of the rails, and side projections from said body, and clamping members depending from said side members and passing beneath the rails.

2. A clamp for railroad rails, said clamp comprising a body portion having sloping track surfaces adapted to align with those of the rails, and overhanging portions on each side of the track surface, and clamping members passing beneath the rail and engaging the overhanging projections.

3. A clamp for railroad rail joints, said clamp comprising a body portion adapted to fit upon the top of the rails, said body portion having track surfaces thereupon aligning with the track surface of the rails, side projections from said track surfaces and open slots in said projections; clamping members passing through said slots and means for causing said clamping members to secure said body portion.

In testimony whereof I have affixed my signature in presence of two witnesses.

WILLIAM MILTON BROWN.

Witnesses:
H. W. SMITH,
S. G. BONN.